US008819578B2

(12) United States Patent
Yamamoto

(10) Patent No.: US 8,819,578 B2
(45) Date of Patent: Aug. 26, 2014

(54) DISPLAY CONTROLLER, DISPLAY CONTROL METHOD, DISPLAY CONTROL PROGRAM, AND PORTABLE TERMINAL DEVICE

(75) Inventor: Etsuji Yamamoto, Kanagawa (JP)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1227 days.

(21) Appl. No.: 12/099,941

(22) Filed: Apr. 9, 2008

(65) Prior Publication Data

US 2008/0256446 A1    Oct. 16, 2008

(30) Foreign Application Priority Data

Apr. 11, 2007 (JP) ................................ P2007-104246

(51) Int. Cl.
 *H04L 29/06* (2006.01)
 *G06F 17/30* (2006.01)
 *G06F 15/16* (2006.01)
 *G06F 3/00* (2006.01)
 *H04L 29/08* (2006.01)

(52) U.S. Cl.
 CPC .... *G06F 17/30899* (2013.01); *G06F 17/30884* (2013.01); *G06F 17/30905* (2013.01); *H04L 67/2823* (2013.01)
 USPC ............ 715/781; 715/747; 715/815; 715/864

(58) Field of Classification Search
 CPC ................... G06F 17/30899; G06F 17/30884; G06F 17/30905; H04L 67/2823
 USPC ................................... 715/781, 747, 815, 864
 See application file for complete search history.

(56) References Cited

U.S. PATENT DOCUMENTS 6,401,094 B1 * 6/2002 Stemp et al. ........................... 1/1
6,832,355 B1 * 12/2004 Duperrouzel et al. ........ 715/788

(Continued)

FOREIGN PATENT DOCUMENTS

JP       2006 209538        8/2006
WO    WO 2006 123513    11/2006

OTHER PUBLICATIONS

Perkowitz M et al: "Towards adaptive Web sites: conceptual framework and case study" Computer Networks, Elsevier Science Publishers B.V., Amsterdam, NL, vol. 31, No. 11-16, May 17, 1999, pp. 1245-1258, XP004304552 ISSN: 1389-1286.

(Continued)

*Primary Examiner* — Jordany Nunez
(74) *Attorney, Agent, or Firm* — Frommer Lawrence & Haug LLP; William S. Frommer

(57) ABSTRACT

A display controller includes display control means by which a partial display of a Web page is performed when the Web page is displayed on display means, display range detecting means for detecting a display range of the Web page displayed on the display means by the display control means, a key input pattern database in which information indicating an operation intended by a user is stored per key input pattern of the operating means, a home position database per URL for registering a home position used as the first display range when a Web page is displayed, together with URL information of each Web page, key input pattern detecting means for detecting a key input pattern of the operating means when the Web page is displayed by the display control means and home position registering means for registering a display range of the Web page detected by the display range detecting means as a home position corresponding to the Web page, together with URL information of the Web page, in the home position database per URL.

6 Claims, 7 Drawing Sheets

(56) References Cited

U.S. PATENT DOCUMENTS

| | | | |
|---|---|---|---|
| 6,900,819 B2* | 5/2005 | Marshall et al. | 345/667 |
| 7,228,492 B1* | 6/2007 | Graham | 715/234 |
| 7,743,334 B2* | 6/2010 | Rider | 715/762 |
| 8,237,664 B2* | 8/2012 | Swanbufg et al. | 345/173 |
| 2002/0054090 A1 | 5/2002 | Silva et al. | |
| 2003/0074416 A1* | 4/2003 | Bates et al. | 345/738 |
| 2003/0101100 A1* | 5/2003 | Sako et al. | 705/26 |
| 2006/0136297 A1* | 6/2006 | Willis et al. | 705/14 |
| 2006/0248463 A1* | 11/2006 | Forkner et al. | 715/730 |
| 2007/0300162 A1* | 12/2007 | Goto | 715/745 |
| 2008/0028335 A1* | 1/2008 | Rohrabaugh et al. | 715/800 |
| 2008/0094421 A1 | 4/2008 | Maeda | |
| 2009/0293018 A1* | 11/2009 | Wilson et al. | 715/811 |
| 2010/0332616 A1* | 12/2010 | Sinha | 709/218 |
| 2012/0023081 A1* | 1/2012 | Nayak et al. | 707/706 |

OTHER PUBLICATIONS

Bickmore T W et al: "Digestor: device-independent access to the World Wide Web" Computer Networks and ISDN Systems, North Holland Publishing. Amsterdam, NL, vol. 29, No. 8-13, Sep. 1, 1997, pp. 1075-1082, XP004095305 ISSN: 0169-7552.

* cited by examiner

FIG. 5

| OPERATION KEY | CONTINUOUS OPERATION TIME | DISPLAY POSITION |
|---|---|---|
| DISPLAY START | 0msec | (0, 0) |
| D | 150msec | (0, 320) |
| R | 180msec | (240, 320) |
| R | 190msec | (480, 320) |
| R | 140msec | (480, 320) |
| R | 2000msec | (720, 320) |
| L | 3000msec | (480, 320) |
| D | 500msec | (720, 640) |
| ⋮ | ⋮ | ⋮ |

KEY INPUT PATTERN

DISPLAY CONTROLLER, DISPLAY CONTROL METHOD, DISPLAY CONTROL PROGRAM, AND PORTABLE TERMINAL DEVICE

BACKGROUND OF THE INVENTION

1. Field of the Invention

The present invention relates to a display controller, a display control method, a display control program and a portable terminal device, which are suitably applied to devices capable of displaying Web (World Wide Web) pages on display sections, such as mobile phones, PHS (Personal Handyphone System), PDA (Personal Digital Assistant), laptop or desktop personal computers, and the like. In particular, the present invention relates to a display controller, a display control method, a display control program and a portable terminal device which are adapted to automatically detect a portion frequently viewed by a user, and thereafter, display first the frequently-viewed portion as a home position in displaying the Web page when the screen size (resolution) of the display section is smaller than the entire size of a Web page and the Web page is partially displayed.

2. Description of Related Art

Japanese unexamined patent application publication No. 2006-209538 (Patent Document) discloses a display device used for information devices with only a small display section, such as portable terminal devices. At the time of viewing a Web page, this display device is adapted to preferentially display, on a display section, a portion of the Web page which contains the information having a high degree of importance for the user, without requiring the user to take the time to perform any scroll operation or the like.

In this display device, at the time of viewing a Web page, the Web page is temporarily stored in a page saving section. When the same Web page is viewed again, a controller detects any updated area by comparing with the contents of the page previously stored in the page saving section. Then, the updated area is displayed on the display section by shifting the display range such that the area may be displayed at a predetermined position in the display section. Thus, the portion probably including the information having a high degree of importance for the user can be preferentially displayed without requiring the user to take the time, such as performing any scroll operation or the like.

SUMMARY OF THE INVENTION

When partially displaying a Web page, a user desires the portion to be preferentially displayed, but the portion is the one on the Web page frequently viewed by the user, and not necessarily the one updated. Further, the portion frequently viewed by the user may vary per each user.

However, the display device disclosed in the Patent Document 1 is adapted to display under control based on the assumption that the area including the updated portion is the one every user desires to be displayed preferentially. It is therefore difficult to preferentially display the portion desired per each user.

It is desirable to provide a display controller, a display control method, a display control program and a portable terminal device, which are adapted to automatically detect, per each user, a portion on a Web page desired by a user, and display first the detected portion when partially displaying the Web page on display means.

A display controller according to the present invention has, as means for solving the issues. The means include display control means for performing a partial display of a Web (World Wide Web) page when the Web page is displayed on display means, by using a range of the Web page corresponding to a screen size of the display means as a display range, and for changing and displaying the display range of the Web page to be displayed on the display means, in response to an operation of operating means, display range detecting means for detecting a display range of the Web page displayed on the display means by the display control means, a key input pattern database in which information indicating an operation intended by a user is stored per key input pattern of the operating means, a home position database per URL for registering a home position used as the first display range when a Web page is displayed, together with URL (Uniform Resource Locator) information of the Web page, key input pattern detecting means for detecting a key input pattern of the operating means when the Web page is displayed by the display control means, and home position registering means for registering a display range on the Web page detected by the display range detecting means as a home position corresponding to the Web page, together with URL information of the Web page, in the home position database per URL, when the key input pattern detected by the key input pattern detecting means is a key input pattern indicating a home position on the Web page, by referring to information being stored in the key input pattern database and indicating an operation content intended by the user, based on the key input pattern of the operating means detected by the key input pattern detecting means.

When a Web page is displayed on the display means, the display control means detects a home position corresponding to URL information of the Web page to be displayed, by referring to the home position database per URL based on the URL information of the Web page to be displayed, and displays first a display range of the home position on the display means.

A display control method according to the present invention includes, as means for solving the issues, a display step of performing a partial display of a Web (World Wide Web) page, when the Web page is displayed on display means, by using a range of the Web page corresponding to a screen size of the display means as a display range, and for changing and displaying the display range of the Web page to be displayed on the display means, in response to an operation of operating means, a display range detecting step in which the display range detecting mean detects a display range of the Web page displayed on the display means in the step, a key input pattern detecting step in which the key input pattern detecting mean detects a key input pattern of the operating means when the Web page is displayed in the display step, and a home position registering step in which home a position registering mean registers a display range on the Web page detected in the display range detecting step as a home position that becomes the first display range at the time of displaying the Web page, together with URL (Uniform Resource Locator) information of the Web page, in a home position database per URL, when the key input pattern detected in the key input pattern detecting step is a key input pattern indicating a home position on the Web page, by referring to a key input pattern database storing information indicating an operation intended by a use per each key input pattern of the operating means, based on the key input pattern of the operating means detected in the key input pattern detecting step.

In the display step, the display control means detects a home position corresponding to URL information of a Web page to be displayed, by referring to the home position database per URL based on the URL information of the Web page to be displayed, and displays first a display range of the home position on the display means.

A display control program according to the present invention is intended to, in order to solve the issues, cause a computer to function as display control means for performing a partial display of a Web (World Wide Web) page, when the Web page is displayed on display means, by using a range of the Web page corresponding to a screen size of the display means as a display range, and for changing and displaying the display range of the Web page to be displayed on the display means, in response to an operation of operating means, cause the computer to function as display range detecting means for detecting a display range of the Web page displayed on the display means by causing the computer to function as the display control means, cause the computer to function as key input pattern detecting means for detecting a key input pattern of the operating means during the time the Web page is displayed on the display means by causing the computer to function as the display control means, and cause the computer to function as home position registering means for registering a display range on the Web page detected by causing the computer to function as the display range detecting means, as a home position that becomes the first display range at the time of displaying a Web page, together with URL (Uniform Resource Locator) information of the Web page, in a home position database per URL, when the key input pattern of the operating mean detected by causing the computer to function as the key input pattern detecting means is a key input pattern indicating a home position on the Web page, by referring to a key input pattern database storing information indicating an operation intended by a user, per each key input pattern of the operating means, based on the key input pattern of the operating means detected by causing the computer to function as the key input pattern detecting means.

The program is also intended for causing the computer to function as the display control means for detecting a home position corresponding to URL information of a Web page to be displayed, by referring to the home position database per URL based on the URL information of the Web page to be displayed, when causing the computer to function as the display control means, and for displaying first a display range of the home position on the display means.

A portable terminal device according to the present invention has, as means for solving the issues, a display control section for performing a partial display of a Web (World Wide Web) page when the Web page is displayed on display means, by using a range of the Web page corresponding to a screen size of the display means as a display range, and for changing and displaying the display range of the Web page to be displayed on the display means, in response to an operation of operating means, a display range detecting section for detecting a display range of the Web page displayed on the display means by the display control means, a key input pattern database in which information indicating an operation intended by a user are stored per key input pattern of the operating means, a home position database per URL for registering a home position used as the first display range when a Web page is displayed, together with URL (Uniform Resource Locator) information of the Web page, a key input pattern detecting section for detecting a key input pattern of the operating means when the Web page is displayed by the display control means, and a home position registering section for registering a display range on the Web page detected by the display range detecting means as a home position corresponding to the Web page, together with URL information of the Web page, in the home position database per URL, when the key input pattern detected by the key input pattern detecting means is a key input pattern indicating a home position on the Web page, by referring to information being stored in the key input pattern database and indicating an operation content intended by the user, based on the key input pattern of the operating means detected by the key input pattern detecting means.

When a Web page is displayed on the display means, the display control means detects a home position corresponding to URL information of the Web page to be displayed, by referring to the home position database per URL based on the URL information of the Web page to be displayed, and displays first a display range of the home position on the display means.

According to embodiments of the present invention, there is provided the key input pattern database in which the information indicating the operation intended by the user is stored per key input pattern of the operating means. When a key input pattern of the operating means is detected at the time of displaying a Web page, the operation intended by the user, which is expressed by the detected key input pattern, is detected by referring to the key input pattern database based on the detected key input pattern. If the detected key input pattern is a key input pattern indicating a home position on the Web page, the display range on the Web page being displayed on the display means is registered in the home position database per URL as a home position used as the firstly displayed range when the Web page is displayed. Thereafter, when the Web page is displayed, the display range of the home position registered in the home position database per URL is displayed first on the display means.

The home position on the Web page is detected by analyzing the key input pattern obtained by the user operation of the operating means. This enables the home position per each user to be automatically detected and registered. This also enables the detected home position to be displayed first when the Web page is displayed next.

BRIEF DESCRIPTION OF THE DRAWINGS

FIG. 5 is a diagram showing an example of display ranges on a Web page corresponding to a user key input pattern of the mobile phone in the embodiment;

DETAILED DESCRIPTION OF THE EMBODIMENT

Embodiments of the present invention is applicable to a mobile phone with a full browser function enabling partial browsing of Web pages, which is designed for personal computers.

[Configuration of Mobile Phone]

Figure 1:
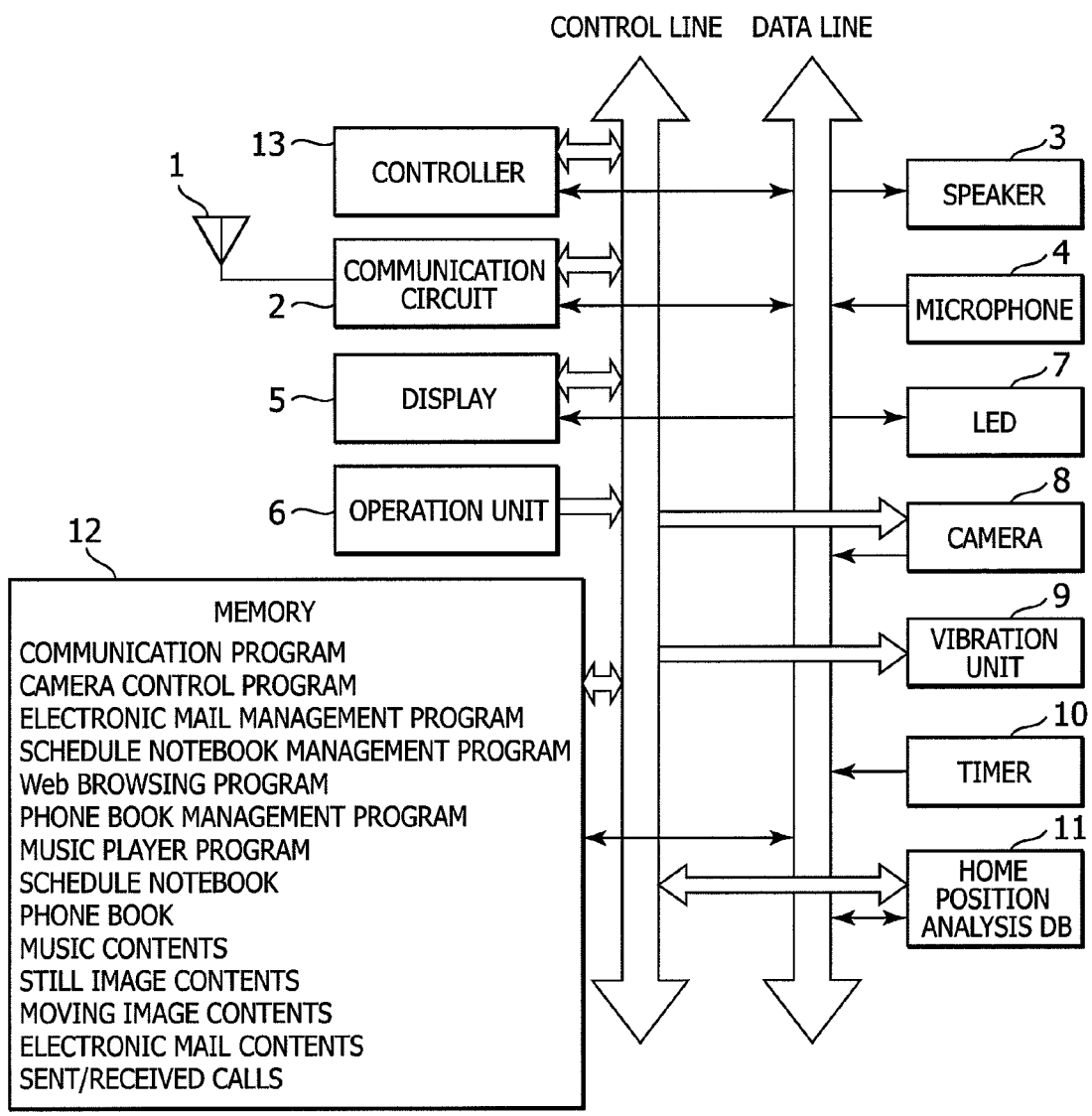
FIG. 1 is a block diagram of a mobile phone of an embodiment to which the present invention is applied.

The mobile phone in an embodiment of the present invention has an antenna 1, a communication circuit 2, a speaker unit 3, a microphone unit 4, a display unit 5 and an operating unit 6, as shown in FIG. 1. The antenna 1 and the communication circuit 2 are for performing radio communications with a base station, such as voice calls, TV phone calls, electronic mails and Web (World Wide Web) data. The speaker section 3 is for sending received voice or the like. The microphone section 4 collects sending voice or the like. The display section 5 is for displaying a moving image and a desired still image, electronic mails, characters in menue, or a Web page transmitted from the other communicating side during a TV phone call. The operating section 6 is for performing the operation of inputting characters, the operation of selecting a desired menu, the operation of scrolling or changing the display range of a Web page to be partially displayed, and the like.

This mobile phone also has an LED (light emitting diode) section 7, a camera unit 8, a vibration unit 9, a timer 10, a home position analysis DB (database) 11, a memory 12 and a controller 13. The LED section 7 is for informing sending/receiving calls or the like by light. The camera unit 8 is for taking an image of a moving image or a still image of a desired object. The vibration unit 9 is for informing sending/receiving of calls or the like by vibration of the casing of the mobile phone. The timer 10 counts time. The home position analysis DB 11 is for analyzing a home position indicating the firstly displayed portion when a Web page is partially displayed based on the full browser function. The memory 12 stores various kinds of application programs, various data (contents) handled under these application programs, respectively, and the like. The controller 13 controls the overall operations of the mobile phone.

The memory 12 stores a communication processing program (a communication program) for performing the radio communication processing via a base station, a camera control program for controlling the image pick-up operation of the camera unit 8, an electronic mail management program for controlling electronic mail creation and sending/receiving, a schedule notebook management program for managing a schedule notebook in which a user schedule is registered, a Web browsing program which realizes the full browser function for viewing Web pages publicized on a server provided on a predetermined network such as internet, a telephone book management program for managing a telephone book, and a music player program for replaying music contents.

The memory 12 also stores a schedule notebook used to register a desired schedule of the user, a telephone book used to register still images of acquaintances, friends and the like of the user, telephone numbers, electronic mail addresses, birthdays, and the like, music contents replayed based on the music player program, still image contents and moving image contents replayed based on a viewer function of the camera control program, received/sent electronic mail contents, and receiving/sending record of phone calls and electronic mails.

[Configuration of Home Position DB]

Figure 2:
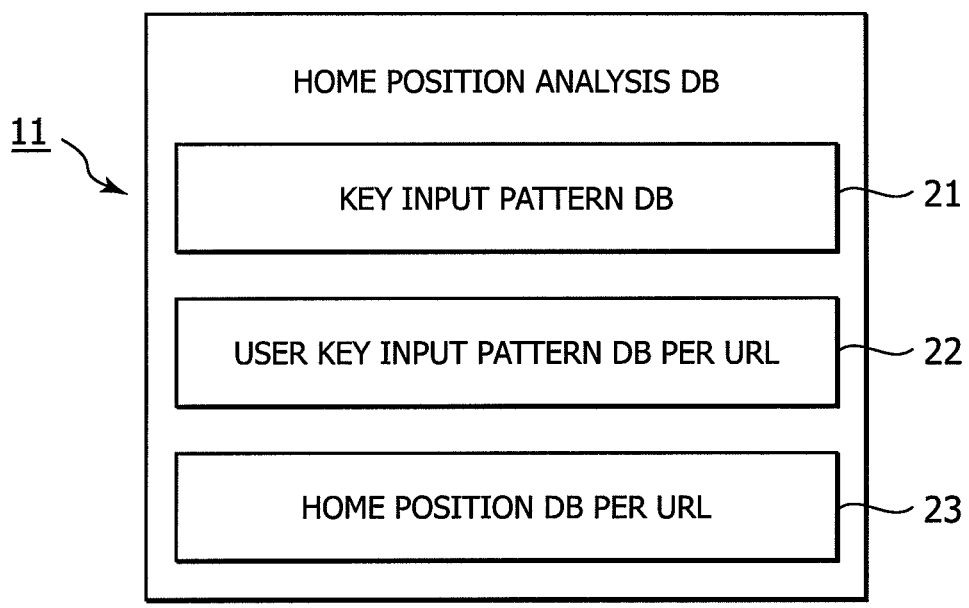
FIG. 2 is a diagram showing the configuration of a home position analyzing database provided the mobile phone in the embodiment.

As shown in FIG. 2, the home position DB 11 has a key input pattern DB 21 where the information indicating the operation intended by the user is stored per key input pattern of the operating unit 6 when a Web page is displayed, an user key input pattern DB per URL 22 where the user key input pattern detected by the actual user operation of the operating unit 6 is stored per URL (Uniform Resource Locator) of each Web page, and a home position DB per URL 23 where the information indicating a home position that indicates the firstly displayed display range are stored per URL of each Web page.

More specifically, the key input pattern DB 21 stores each key input pattern in an embodiment obtained in advance by the operation test and the like of the operating unit 6, which was conducted by the manufacturer of the mobile phone, and the information indicating the user intentions implied by these key input patterns. As will be described later, in this mobile phone of the present embodiment, the user intention implied by the key input pattern obtained from the user actually operating the operating unit 6, which is detected when a Web page is displayed, is detected based on the respective key input patterns and the information indicating the operations desired by the user stored in the key input pattern DB 21. Based on the detection result, the home position on the Web page is determined.

[Automatic Home Position Registration Operation]

Figure 3:
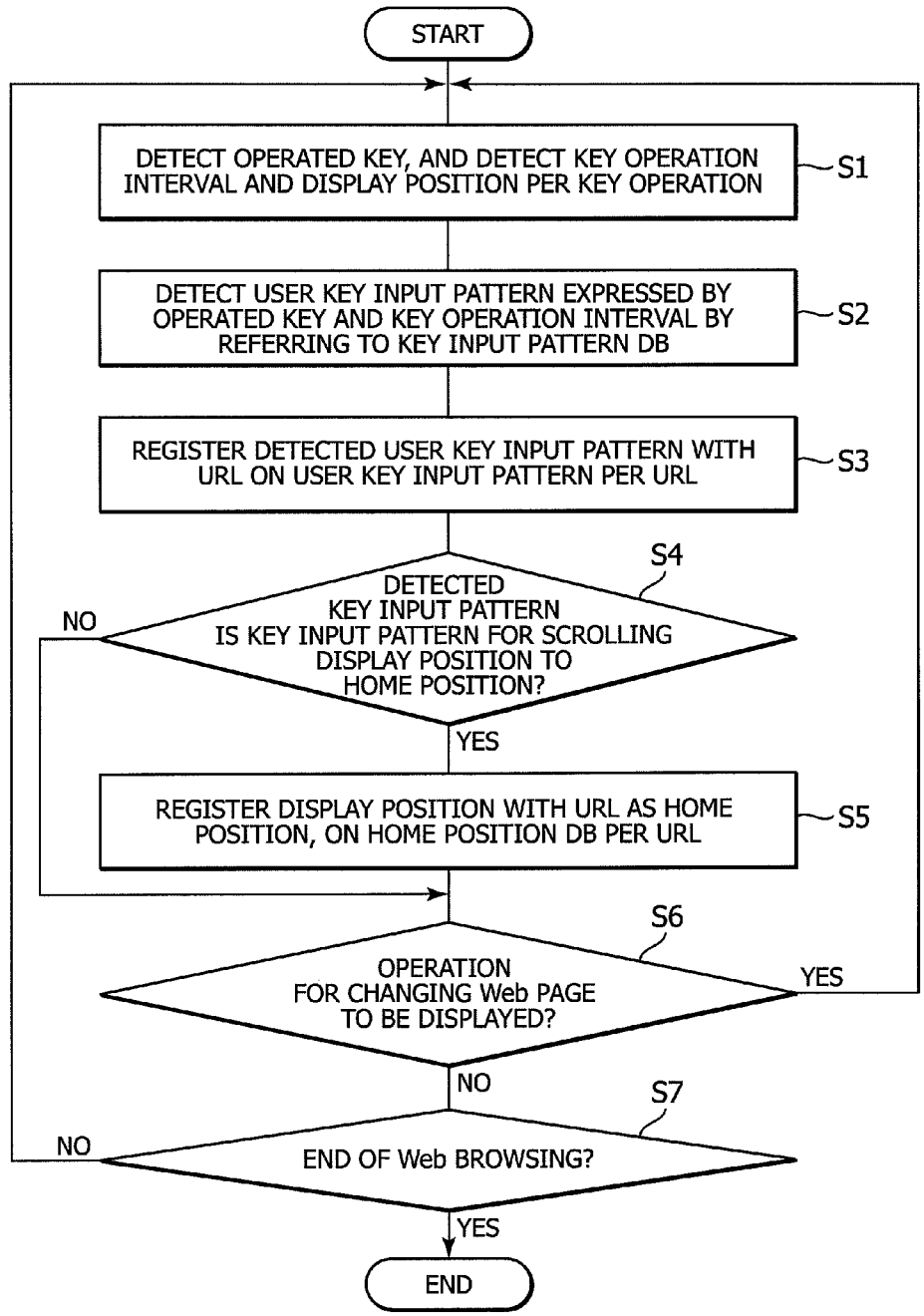
FIG. 3 is a flow chart showing the automatic registration operation of a home position of the mobile phone in the embodiment.

The flowchart of FIG. 3 shows the flow of an automatic home position registration operation of the mobile phone in the embodiment. When a display specification of a Web page is made by the user through the operating unit 6, the controller 13 controls to display the specified Web page on the display unit 5, based on the Web browsing program stored in the memory 12. At the timing of the display control of the Web page on the display unit 5, the controller 13 starts the procedure shown in the flow chart of FIG. 3, based on the Web browsing program.

In step S1, the controller 13 detects the key of the operating section 6 operated by the user, and also detects the time interval from this key operation to the subsequent key operation (interval=the continuous operation time of a single key), and a display range on the Web page (the display position on the Web page) displayed on the display unit 5 in response to the respective key operations. A process then advances to step S2.

In step S2, the controller 13 detects the user key input pattern by referring to the key input pattern DB 21 of the home position DB 11, based on the keys operated by the user and the key operation interval detected in step S1. In step S3, the controller 13 registers the detected user key input pattern in the user key input pattern DB per URL 22 of the home position analysis DB 11 together with the URL information of the Web page currently displayed on the display unit 5.

Figure 4:
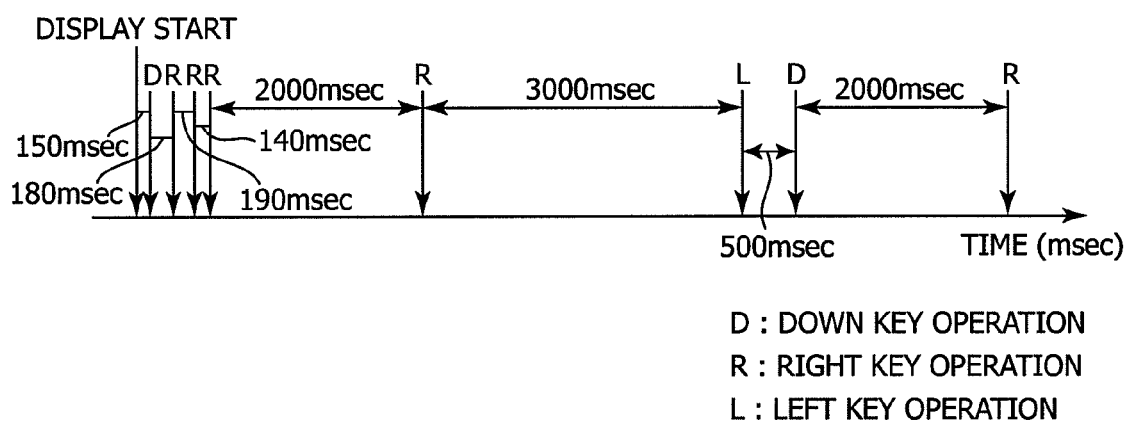
FIG. 4 is a diagram showing an example of user key input patterns for analyzing the home position of the mobile phone in the embodiment.

The foregoing operations will be specifically described below. For example, as shown in FIG. 4, when the down key (D) of the cross keys is continuously operated for 150 msec at first from the display start of a Web page, secondly the right key (R) is continuously operated at the intervals of 180 msec, 190 msec, 140 msec and 2000 msec, respectively, thirdly the left key (L) is continuously operated for 3000 msec, fourthly the down key (D) is continuously operated for 500 msec, and finally the right key (R) is continuously operated for 2000 msec. In that case, the controller 13 detects the continuous operation times of the respective keys, and the display positions on the Web page controlled so as to be displayed on the display section 5 in response to the respective key operations, as shown in FIG. 5.

As an example, in this display position detection, the controller 13 sets the X coordinate and the Y coordinate at the upper left corner of the Web page as (0, 0), respectively, and detects the coordinate of the display position shifted from the coordinate (0, 0) in response to the key operation of the operating unit 6. That is, as shown in the example of FIG. 5, when the coordinate of the display position on the Web page to be displayed on the display unit 5 is shifted from (0, 0) to (0, 320) by causing the down key to be continuously operated from the display start for 150 msec, the controller 13 detects the coordinate (0, 320) as the coordinate of the display position shifted by being subject to the continuous 150 msec operation of the down key from the display start. Similarly, when the coordinate of the display position on the Web page to be displayed on the display unit 5 is shifted from (0, 320) to (240, 320) by causing the right key to be continuously operated for 180 msec after the down key operation, the controller 13 detects the coordinate (240, 320) as the coordinate of the display position shifted by the continuous 180 msec operation of the right key from the display position of the coordinate (0, 320).

In other words, the controller 13 detects to which portion of the entire Web page the display range of the Web page currently displayed on the display unit 5 corresponds, based on the coordinate on the Web page corresponding to the upper left corner of the display unit 5. Consequently, at the time of the display start of a Web page, this Web page is partially displayed in a manner that the upper left corner (namely the coordinate (0, 0)) of the Web page is positioned at the upper left corner of the display unit 5. In such a case, the controller 13 detects the display position of the Web page in this case as the coordinate (0, 0). Further, when the operating unit 6 is operated to partially display a Web page in a manner that the coordinate (0, 320) of the Web page is positioned at the upper left corner of the display unit 5, the controller 13 detects the display position of the Web page in this case as the coordinate (0, 320).

Subsequently, the controller 13 detects the key input pattern of the user by operating the operating unit 6 with reference to the key input pattern stored in the key input pattern DB 21 of the home position analysis DB 11. The controller 13 then registers the obtained key input pattern together with the URL information of the Web page currently displayed on the display section 5, in the key input pattern DB 21 of the home position analysis DB 11 (step S3).

Next, the controller 13 registers the user key input pattern in the key input pattern DB 21, and then a process advances to step S4. In step S4, the controller 13 judges whether the user key input pattern detected in step S3 is the key input pattern for scrolling the display position to a desired home position.

As described above, the key input pattern DB 21 stores the key input patterns obtained by the operation test of the operating unit 6 conducted in advance by the manufacturer of the mobile phone in the present embodiment, and the information indicating the user intentions implied by the key input patterns. Specifically, as an example, the key input pattern DB 21 stores the following key input patterns and the information indicating the user intentions implied by these key input patterns, respectively:

(1) A key input pattern operated continuously at short key input intervals implies that the user intends to perform a scroll operation to a home position;

(2) A key input pattern, in which the page up key or the page down key is continuously operated for a plurality of times, implies that the user intends to perform a scroll operation to a home position; and (3) A key input pattern, in which the right key and the down key operations are repeated for a relatively long period of time, may imply that the displayed range is a home position.

The controller 13 analyzes the user key input pattern detected in step S3, based on the respective key input patterns registered in the key input pattern DB 21. If it is judged that the user key input pattern is the operation corresponding to a home position, a process advances to step S5. If it is judged as the user key input pattern is not an operation corresponding to home position, a process advances to step S6.

When a process is advanced to step S6 based on the judgment that the user key input pattern is not the operation corresponding to the home position, the controller 13 monitors the operating condition of the operating unit 6 to judge whether the operation for specifying the display of a Web page different from the Web page displayed on the display unit 5 and whether the operation specifying the end of browsing of the Web page is performed at step S7.

If the operation of displaying and specifying any different Web page is not detected, but the operation specifying the end of browsing of the Web page is detected, the controller 13 ends the entire procedure shown in the flow chart of FIG. 3. On the other hand, if the operation of displaying and specifying of a different Web page is detected, and if an operation of specifying the end of browsing of the Web page is not detected, the controller 13 returns the process to step S1. Thus, the operation of detecting a home position is performed again.

On the other hand, in step S4, if it is judged that the user key input pattern is the key input pattern for scrolling the display position to a desired home position, the controller 13 advances the process to step S5. In step S5, the controller 13 registers the display range of the Web page currently displayed on the display unit 5 as the home position of the Web page, together with the URL information of the Web page, in the home position DB per URL 23 of the home position analysis DB 11. Specifically, when the controller 13 detects the display range of the Web page currently displayed on the display unit 5, as described with reference to FIG. 5, the coordinate on the Web page currently displayed at the upper left corner of the display unit 5 is detected as the display range of the Web page currently displayed on the display unit 5. The controller 13 will therefore register in step S5, coordinate information such as (240, 320) along with the URL information such as "http://www.XXX.jp" in the home position DB per URL 23, as the home position of the Web page.

The controller 13 performs repetitively the home position registration until the operation specifying the end of browsing of a Web page is detected in step S7, and the home position registration is performed repeatedly each time change operation of the Web page to be displayed is detected in step S6. Thus, the home positions corresponding to Web pages, respectively, will be automatically registered sequentially in the home position DB per URL 23.

[Home Position Display Operation]

Figure 6:
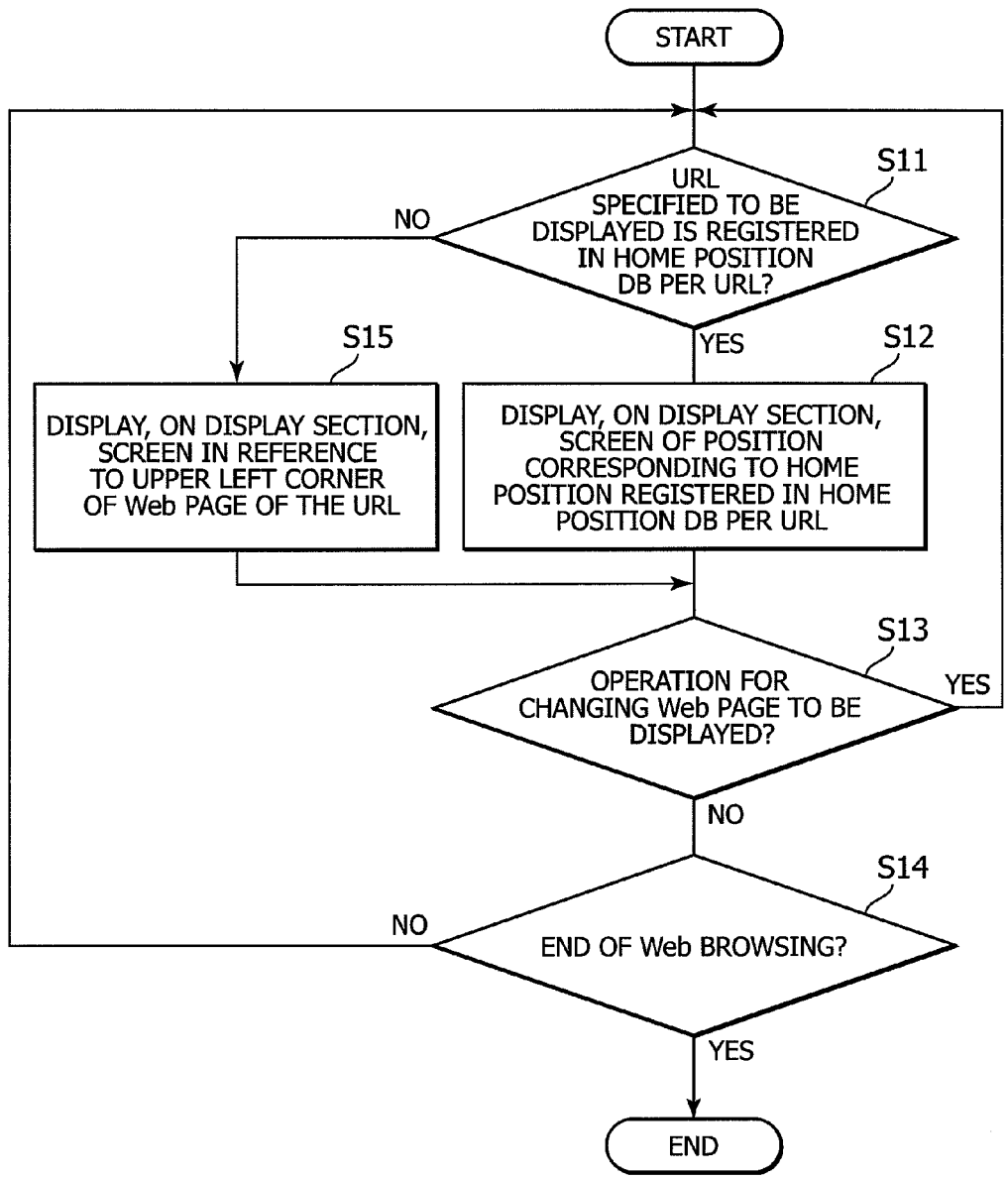
FIG. 6 is a flow chart showing the display operation of a home position of the mobile phone in the embodiment.

Since the home position of a Web page is thus registered, the home position corresponding to this Web page will be displayed firstly in the display unit 5 from next browsing. The flow of display operation of a home position is shown in the flow chart of FIG. 6. At the timing, the display of the Web page is specified by the user, the controller 13 starts the procedure shown in the flow chart of FIG. 6, based on the Web browsing program stored in the memory 12.

In step S11, the controller 13 judges if the URL information of the Web page whose display is specified by the user is already registered in the home position DB per URL 23. The absence of the URL information of the Web page whose display is specified by a user in the home position DB per URL 23 means that the home position corresponding to the Web page is not registered. Accordingly, the controller 13 advances the process to step S15, and controls to display on the display unit 5 a screen in reference to the upper left corner on the Web page of the URL, as shown by the dotted-line frame in FIG. 7. The display range expressed by the dotted-line frame in FIG. 7 shows the display screen size of the display unit 5.

Figure 7:
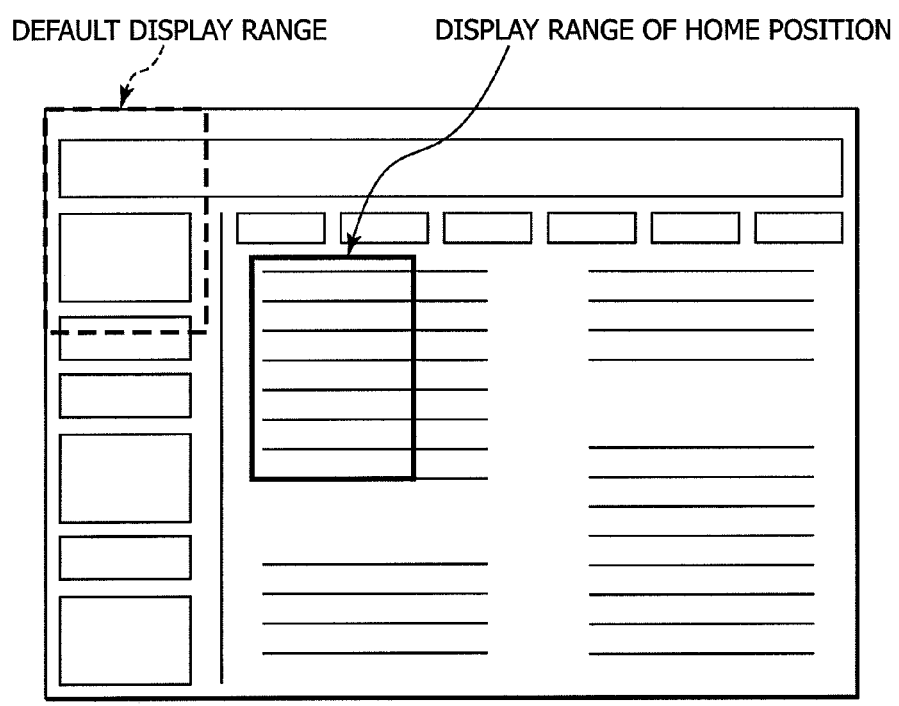
FIG. 7 is a diagram showing a range on the Web page displayed at the mobile phone in the embodiment as a home position.

That is, if no home position is registered, the controller 13 displays a displayable range by default on the display screen of the display unit 5, with reference to the upper left corner of the Web page of the current URL, as shown by the dotted-line frame in FIG. 7. In the absence of any home position registration, based on the user key input pattern when the Web page is viewed, the home position corresponding to this Web page will be detected and registered in the home position DB per URL 23, as described in FIG. 3 by utilizing a flow chart.

On the other hand, when the URL information of a Web page whose display is specified by the user is already registered in the home position DB per URL 23, in step S12, the controller 13 detects the home position of the Web page registered in the home position DB per URL 23 along with the URL information, and controls to display on the display unit 5 the display range on the Web page corresponding to this home position, as shown by the solid-line frame in FIG. 7. Hence, in the presence of the home position registered in the home position DB per URL 23, when the Web page is viewed, the display range of the Web page corresponding to the registered home position can be firstly displayed on the display unit 5.

After the Web page is thus displayed, the controller 13 advances the procedure to step S13, and monitors the operating condition of the operating unit 6 in order to judge whether the operation specifying the display of a Web page different from the Web page currently displayed on the display unit 5. If operation specifying display of the different Web page is detected, the controller 13 returns the procedure to step S11, and judges again whether the home position corresponding to the Web page whose display is specified by the user is already registered. In step S15, based on the judgment result, the controller 13 controls to display on the display unit 5 the display range on a Web page to be defaulted, or alternatively controls to display on the display unit 5 the display range of the home position corresponding to the Web page.

On the other hand, if the operation specifying the display of a different Web page is not detected in step S13, the controller 13 advances the procedure to step S14, and monitors the operating condition of the operating section 6 to judge whether the operation for specifying the end of browsing the Web page is performed or not. If an operation specifying the end of browsing of the Web page is detected, the controller 13 ends the entire procedure shown in the flow chart of FIG. 6. If an operation for specifying the end of browsing of the Web page is not detected, the controller 13 returns the procedure to step S11, and continues the display of the currently displayed Web page until the operation for changing the Web page to be displayed is detected in step S13, or until the operation for specifying the end of view of the Web page is detected in step S14.

[Home Position Update Operation]

In the mobile phone of the present embodiment, as described above, the home position of each Web page will be registered sequentially in the home position DB per URL 23. Even on the same Web page, however, the home position desired by the user may be changed as time elapses, or the like.

Hence, when a home position registration is performed in step S5 of the flowchart in FIG. 3, the controller 13 judges whether the URL information same with that of a Web page to be newly registered is already registered in the home position DB per URL 23 or not is judged. That is, the controller 13 judges whether the home position of the Web page to be newly registered is already registered in the home position DB per URL 23.

If the home position of the Web page to be newly registered is not registered in the home position DB per URL 23, the controller 13 directly performs the home position registration. If this home position on the Web page to be newly registered is already registered in the home position DB per URL 23, the controller 13 performs the registration of the detected home position in a manner it overwrites the already registered home position.

That is, the controller 13 updates the home position sequentially each time the home position of a Web page of the same URL is detected. This enables a new home position to be registered at any time in the home position DB per URL 23.

Such a display range on a Web page that the user desires to display as a home position is highly likely to be a display range detected as a home position at the time of the previous view. Therefore, by updating the home position registered in the home position DB per URL 23 so that a new home position is registered at any time, even if the home position desired by the user is changed with the elapse of time, or the like, and such a display range that is highly liable to be desired by the user can be automatically registered and displayed as the home position of the Web page, accompanying with the change.

[Modifications of Home Position Registration Operation and Display Operation]

The example is for registering and displaying a home position with respect to a Web page. Alternatively, by registering a plurality of home position candidates per a Web page, the number of detections of the home position candidates may be counted, and a home position candidate having a high count value may be selected and displayed.

In this case, whenever any key input pattern indicating a home position is detected in step S4 of the flow chart in FIG. 3, the controller 13 registers the display range on the Web page in the home position DB per URL 23, as a home position candidate. Thus, a plurality of home position candidates per a single Web page can be registered in the home position DB per URL 23.

Subsequently, the controller 13 counts the number of repetitive detections of home position candidates detected repetitively from among the home position candidates registered in the home position DB per URL 23, by incrementing by, for example, "1" per detection. Thus, on the Web page, the number of repetitive detections of the home position candidate corresponding to a portion intensively viewed by the user will gradually become a large count value.

When a Web page is displayed, the controller 13 refers to the home position DB per URL 23, and detects, from among the home position candidates corresponding to the Web page, home position candidates having a count value not less than a predetermined count value, for example, "5". If all of the count values of these home position candidates are lower than the predetermined count value, the controller 13 displays a range in reference to the upper left corner of the Web page, as shown by the dotted-line frame in FIG. 7. On the other hand, in the presence of the home position candidate having a count value not less than the predetermined count value, the controller 13 displays first, on the display unit 5, the display range on the Web page corresponding to the home position candidate having the largest count value out of the home position candidates having a count value not less than the predetermined count value.

Thus, by registering a plurality of home position candidates per a Web page, and counting the number of repetitive detections of these home position candidates, respectively, the count value of the home position candidate corresponding to the portion intensively viewed by an user on a Web page will gradually become large. Therefore, by firstly displaying the display range on the Web page corresponding to the home position candidate having the largest count value on the display unit 5, even if the home position desired by the user is changed along the elapse of time, or the like, a display range highly likely to be desired by the user can be automatically displayed as the home position of the Web page, by accompanying the change.

Further, when the count values of all of the home position candidates are lower than the predetermined count value, it can be said that the respective home position candidates has a low possibility of being home position candidate corresponding to the display range on a Web page strongly desired by the user. Hence, by displaying the range in reference to the upper left corner of a Web page, which is to be defaulted if all of the home position candidates have a count value lower than the predetermined count value, it is possible to prevent the disadvantage of displaying the display range corresponding to any uncertain home position candidate.

[Effects of Embodiment]

As can be seen from the foregoing description, in the mobile phone of the present embodiment, the controller 13 detects a key input pattern of the operating unit 6 when a Web page is displayed. Based on the detected user key input pattern, the controller 13 refers to the key input pattern DB 21, thereby detecting the operation intended by the user, which is expressed by the detected key input pattern. When the detected key input pattern is the key input pattern indicating the home position on the Web page, the display range on the Web page currently displayed on the display unit 5 is automatically registered in the home position DB per URL 22 as the home position, which becomes the firstly displayed range when the Web page is displayed, along with the URL information of the Web page. Thereafter, when the Web page is displayed, the display range of the home position registered in the home position DB per URL 22 is firstly displayed on the display unit 5.

Accordingly, the portion on the Web page really desired to be viewed by the user can be automatically detected per user. When the Web page is partially displayed on the display unit 5, a partial display range on the Web page corresponding to the detected home position can be displayed first.

In the example, a home position is automatically detected and registered in the home position DB per URL 23 of the home position analysis DB 11. Alternatively, the user may manually register a home position. For example, during the view of a Web page, the user operates a menu operating key by scrolling the display range up to a desired home position of the Web page. If the controller 13 detects the operation of the menu operation key while viewing the Web page, controller 13 displays, on the display unit 5, instruction items for setting a home position or a message asking Yes or No about home position setting, such as "Do you wish to set the current display range as a home position? Yes/No". When the user operates the operating unit 6 so as to instruct the setting of the current display range as a home position, the controller 13 registers the display position information indicating the current display range, along with the URL information of the Web page, in the home position DB per URL 23 (or alternatively, the display position information indicating the current display range, along with the URL information, may be registered in a book mark memory as book mark data). Thereafter, when the Web page is displayed, the home position manually set by an user in advance may be displayed.

Although the present invention is applied to the mobile phone in the embodiments, the present invention may be applied to PHS (Personal Handyphone System) phones, PDA (Personal Digital Assistant) devices, laptop or desktop type personal computers, and the like. In any case, the same effect as above can be attained.

While the described embodiments are just one example of the present invention, and it will be understood that many changes and modifications may be made therein without departing from the technical concept of the invention.

In embodiments of the present invention, such a portion on a Web page that each user really desires to view can be automatically detected per user. When the Web page is partially displayed on the display means, the detected portion can be displayed first on the display means.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-104246 filed in the Japanese Patent Office on Apr. 11, 2007, the entire content of which being incorporated herein by reference.

What is claimed is:

1. A display controller comprising:
    display control means by which a partial display of a Web (World Wide Web) page is performed when the Web page is displayed on display means, while a range of the Web page corresponding to a screen size of the display means is a display range, and the Web page is displayed on display means by changing the display range of the Web page, in response to an operation of operating means;
    display range detecting means for detecting a display range of the Web page displayed on the display means by the display control means;
    a key input pattern database in which information indicating an operation intended by a user is stored per key input pattern of the operating means;
    a home position database per URL for registering a home position used as the first display range when a Web page is displayed, together with URL (Uniform Resource Locator) information of each Web page;
    key input pattern detecting means for detecting a key input pattern of the operating means when the Web page is displayed by the display control means; and
    home position registering means for registering a home position when the key input pattern detected by the key input pattern detecting means is a key input pattern indicating a home position on the Web page,
    wherein a key input pattern includes a continuous operation time of a single key and a coordinate shift of a predetermined point of the Web page in response to the operation of the single key,
    wherein registering a home position comprises (1) detecting whether the key input pattern indicates a home position on a Web page, and (2) registering a display range of the Web page detected by the display range detecting means as a home position corresponding to the Web page and URL information of the Web page, in the home position database per URL,
    wherein detection of whether the key input pattern indicates a home position is done by referring to information being stored in the key input pattern database and indicating an operation content intended by the user, based on the key input pattern of the operating means detected by the key input pattern detecting means,
    wherein the home position registering step determines a user's intention to reach a home position when the key input pattern indicates one operation selected from the group consisting of a continuous operation of the operation means at a predetermined interval, a continuous operation of a page-turning key of the operating means, and a repeated operation between two operation keys of the operating means for a predetermined period of time, and wherein, when the Web page is displayed on the display means, the display control means detects a home position corresponding to URL information of the Web page to be displayed, by referring to the home position database per URL based on the URL, information of the Web page to be displayed, and displays first a display range of the home position on the display means.

2. The display controller according to claim 1, wherein; if it is found that a home position corresponding to a Web page of identical URL is already registered at time of registering a home position in the home position database per URL, the home position registering means updates and registers the display range on the Web page detected by the display range detecting means in the home position database per URL as a new home position corresponding to the Web page.

3. The display controller according to claim 1, wherein; whenever a key input pattern indicating a home position on the Web page is detected, the home position registering means registers a display range on the Web page detected by the display range detecting means in the home position database per URL, as a home position candidate corresponding to the Web page, and increments a count value indicating the number of repetitive detections of the home position candidate whenever the display range same with that of a home position candidate already registered in the home position database per URL is detected by the display range detecting means, and when a Web page is displayed on the display means, the display control means detects the count value of each home position candidate corresponding to the URL information of the Web page from the home position database per URL, and displays first on the display means a display range of a home position candidate having the maximum count value from among home position candidates having a count value of equal to or larger than a predetermined value.

4. A display control method comprising:

a display step in which a display control mean performs a partial display of a Web (World Wide Web) page, when the Web page is displayed on display means, by using as a display range a range of the Web page corresponding to a screen size of the display means, and changes and displays the display range of the Web page to he displayed on the display means, in response to an operation of operating means;

a display range detecting step in which a display range detecting mean detects a display range of the Web page displayed on the display means in the step;

a key input pattern detecting step in which a key input pattern detecting mean detects a key input pattern of the operating means when the Web page is displayed in the display step; and a home position registering step for registering a home position when the key input pattern detected by the key input pattern detecting step is a key input pattern indicating a home position on the Web page, wherein a key input pattern includes a continuous operation time of a single key and a coordinate shift of a predetermined point of the Web page in response to the operation of the single key, wherein the home position registering step (1) detects whether the key input pattern indicates a home position on a Web page, and (2) registers a display range on the Web page detected at the display range detecting step as a home position that becomes the first display range at the time of displaying the Web page and URL (Uniform Resource Locator) information of the Web page, in an home position database per URL, by referring to a key input pattern database storing information indicating an operation intended by a user, per each key input pattern of the operating means, based on the key input pattern of the operating means detected in the key input pattern detecting step, wherein, in the display step, the display control means detects a home position corresponding to URL information of a Web page to be displayed, by referring to the home position database per URL based on the URL information of the Web page to be displayed, and displays first a display range of the home position on the display means, and wherein the home position registering step determines a user's intention to reach a home position when the key input pattern indicates one operation selected from the group consisting of a continuous operation of the operating means at a predetermined interval, a continuous operation of a page-turning key of the operating means, and a repeated operation between two operation keys of the operating means for a predetermined period of time.

5. A non-transitory computer readable recording medium for storing a computer program for displaying a Web Page, wherein the program comprises:

performing a partial display of a Web (World Wide Web) page, when the Web page is displayed on a display means, by using as a display range a range of the Web page corresponding to a screen size of the display means, and changing and displaying the display range of the Web page to be displayed on the display means, in response to an operation of operating means;

detecting a display range of the Web page displayed on the display means by causing the computer to function as the display control means;

detecting a key input pattern of the operating means during the time the Web page is displayed on the display means by causing the computer to function as the display control means;

detecting whether the key input pattern indicates a home position on a Web page;

registering a display range on the Web page when the key input pattern of the operation mean detected by causing the computer to function as the key input pattern detecting means is a key input pattern indicating a home position on the Web page, by causing the computer to function as the display range detecting means, as a home position that becomes the first display range when displaying a Web page and URL (Uniform Resource Locator) information of the Web page, in a some position database per URL, by referring to a key input pattern database storing information indicating an operation intended by a user, per each key input pattern of the operating means, based on the key input pattern of the operating means detected by causing the computer to function as the key input pattern detecting means; and causing the computer to function as the display control means for detecting a home position corresponding to URL information of a Web page to be displayed, by referring to the home position database based on the URL information of the Web page to be displayed, and for displaying first a display range of the home position on the display means, wherein the step of detecting whether the key input pattern indicates a home position on a Web page determines a user's intention to reach a home position when the key input pattern indicates one operation selected from the group consisting of a continuous operation of the operating means at a predetermined interval, a continuous operation of turning key of the operating means, and a repeated operation between two operation keys of the operating means for a predetermined period of time, and wherein a key input pattern includes a continuous operation time of a single key and a coordinate shift of a predetermined point of the Web page in response to the operation of the single key.

6. A portable terminal device comprising:

display control means for performing a partial display of a Web (World Wide Web) page when the Web page is displayed on display means, by using as a display range a range of the Web page corresponding to a screen size of the display means, and for changing and displaying the display range of the Web page to be displayed on the display means, in response to an operation of operating means;

display range detecting means for detecting a display range of the Web page displayed on the display means by the display control means;

a key input pattern database in which information indicating an operation intended by a user is stored per key input pattern of the operating means;

a home position database per URL for registering a home position used as the first display range when a Web page is displayed, together with URL (Uniform Resource Locator) information of the Web page;

wherein a key input pattern includes a continuous operation time of a single key and a coordinate shift of a predetermined point of the Web page in response to the operation of the single key, key input pattern detecting means for detecting a key input pattern of the operating means when the Web page is displayed by the display control means; and home position registering means for registering a home position when the key input pattern detected by the key input pattern detecting means is a key input pattern indicating a home position on the Web page, (1) detecting whether the key input pattern indicates a home position on a Web page, and (2) registering a display range on the Web page detected by the display range detecting means as a home position corresponding to the Web page and URL information of the Web page, in the home position database per URL, by referring to information which is stored in the key input pattern database and indicative of an operation content intended by the user, based on the key input pattern of the operating means detected by the key input pattern detecting means;

wherein the home position registering means determines a user's intention to reach a home position when the key input pattern indicates one operation selected from the group consisting of a continuous operation of the operating means at a predetermined interval, a continuous operation of a page-turning key of the operating means, and a repeated operation between two operation keys of the operating means for a predetermined period of time, and wherein, when a Web page is displayed on the display means, the display control means detects a home position corresponding to URL information of the Web page to be displayed, by referring to the home position database per URL based on the URL, information of the Web page to be displayed, and displays first a display range of the home position on the display means.

* * * * *